US010706887B2

(12) United States Patent
Tokutake

(10) Patent No.: US 10,706,887 B2
(45) Date of Patent: *Jul. 7, 2020

(54) APPARATUS AND METHOD FOR DISPLAYING TIMES AT WHICH AN OBJECT APPEARS IN FRAMES OF VIDEO

(71) Applicant: Sony Corporation, Tokyo (JP)

(72) Inventor: Kenji Tokutake, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/409,898

(22) Filed: May 13, 2019

(65) Prior Publication Data
US 2019/0267039 A1 Aug. 29, 2019

Related U.S. Application Data

(63) Continuation of application No. 14/950,329, filed on Nov. 24, 2015, now Pat. No. 10,332,559, which is a
(Continued)

(51) Int. Cl.
G06F 16/74 (2019.01)
G11B 27/10 (2006.01)
(Continued)

(52) U.S. Cl.
CPC ........ *G11B 27/005* (2013.01); *G06F 3/04842* (2013.01); *G06F 3/04847* (2013.01);
(Continued)

(58) Field of Classification Search
None
See application file for complete search history.

(56) References Cited

U.S. PATENT DOCUMENTS 5,664,227 A * 9/1997 Mauldin ............... G06F 16/739
715/203
6,144,375 A * 11/2000 Jain ...................... G11B 27/105
715/251
(Continued)

FOREIGN PATENT DOCUMENTS

JP 2001-211408 A 8/2001
JP 2008-17041 A 1/2008
JP 2008-98726 A 4/2008

OTHER PUBLICATIONS

Extended European Search Report dated Jun. 28, 2011 in corresponding European Application No. 11159728.
(Continued)

*Primary Examiner* — Tahmina N Ansari
(74) *Attorney, Agent, or Firm* — Xsensus LLP

(57) ABSTRACT

An information processing apparatus comprising that includes a reproduction unit to reproduce video content comprising a plurality of frames; a memory to store a table including object identification information identifying an object image, and frame identification information identifying a frame of the plurality of frames that includes the object image; and a processor to extract the frame including the object image from the video content and generate display data of a reduced image corresponding to the frame for display.

16 Claims, 11 Drawing Sheets

Related U.S. Application Data continuation of application No. 14/276,599, filed on May 13, 2014, now Pat. No. 9,236,089, which is a continuation of application No. 12/940,512, filed on Nov. 5, 2010, now Pat. No. 8,787,618.

(60) Provisional application No. 61/323,564, filed on Apr. 13, 2010.

(51) Int. Cl.

| | |
|---|---|
| *G11B 27/00* | (2006.01) |
| *G06F 16/783* | (2019.01) |
| *G11B 27/28* | (2006.01) |
| *G11B 27/32* | (2006.01) |
| *G11B 27/34* | (2006.01) |
| *H04N 5/91* | (2006.01) |
| *G06F 3/0484* | (2013.01) |

(52) U.S. Cl.
CPC ........ *G06F 16/745* (2019.01); *G06F 16/7837* (2019.01); *G11B 27/10* (2013.01); *G11B 27/105* (2013.01); *G11B 27/28* (2013.01); *G11B 27/322* (2013.01); *G11B 27/34* (2013.01); *H04N 5/91* (2013.01)

(56) References Cited

U.S. PATENT DOCUMENTS

| | | | | |
|---|---|---|---|---|
| 6,681,043 | B1 * | 1/2004 | Lau | G06F 3/0481 |
| | | | | 382/173 |
| 7,313,808 | B1 | 12/2007 | Gupta et al. | |
| 8,311,277 | B2 * | 11/2012 | Peleg | G11B 27/034 |
| | | | | 382/103 |
| 8,787,618 | B2 * | 7/2014 | Tokutake | G11B 27/105 |
| | | | | 382/103 |
| 2006/0117356 | A1 * | 6/2006 | Jojic | G11B 27/034 |
| | | | | 725/88 |
| 2007/0133947 | A1 | 6/2007 | Armitage et al. | |
| 2008/0131073 | A1 * | 6/2008 | Ogawa | G11B 27/28 |
| | | | | 386/278 |
| 2008/0144890 | A1 | 6/2008 | Ogawa | |
| 2008/0155617 | A1 * | 6/2008 | Angiolillo | H04N 7/17318 |
| | | | | 725/93 |
| 2009/0089712 | A1 * | 4/2009 | Sato | G06F 3/0482 |
| | | | | 715/838 |
| 2009/0199098 | A1 | 8/2009 | Kweon et al. | |
| 2011/0249861 | A1 * | 10/2011 | Tokutake | G11B 27/105 |
| | | | | 382/103 |
| 2011/0321003 | A1 * | 12/2011 | Doig | G06F 8/34 |
| | | | | 717/107 |
| 2014/0248034 | A1 * | 9/2014 | Tokutake | G11B 27/105 |
| | | | | 386/241 |

OTHER PUBLICATIONS

Summons to attend oral proceedings pursuant to Rule 115(1) EPC dated Oct. 14, 2019, issued in corresponding European Patent Application No. 11159728.2, 9 pages.

* cited by examiner

APPARATUS AND METHOD FOR DISPLAYING TIMES AT WHICH AN OBJECT APPEARS IN FRAMES OF VIDEO

CROSS REFERENCE TO RELATED APPLICATIONS

This application is a continuation of and is based upon and claims the benefit of priority under 35 U.S.C. § 120 for U.S. Ser. No. 14/950,329, filed Nov. 24, 2015, which is a continuation of Ser. No. 14/276,599, filed May 13, 2014, now U.S. Pat. No. 9,236,089, issued Jan. 12, 2016, which is a continuation of U.S. Ser. No. 12/940,512, filed Nov. 5, 2010, now U.S. Pat. No. 8,787,618, issued Jul. 22, 2014, and claims the benefit of priority of Provisional Application Ser. No. 61/323,564, filed Apr. 13, 2010. The entire contents of each are incorporated herein by reference.

BACKGROUND OF THE INVENTION

1. Field of the Invention

The present invention relates to a content information processing device, a content information processing method, a content information processing program, and a personal digital assistant, which play at least content information to be played along a time axis such as with a moving image, for example.

2. Description of the Related Art

In recent years, there have come into wide-spread use content information processing devices which include a large-capacity storage device, play various types of content information, for example, such as a moving image stored in the storage device.

Also, for example, with Japanese Unexamined Patent Application Publication No. 2008-98726 (FIG. 2), an audio-visual device has been described wherein information indicating content features corresponding to a content playback position is obtained, and a progress bar to which the feature information thereof is added is displayed according to a content playback position. According to the technique described in the present patent publication, information used for telling what is in a content is displayed within one screen in a compact manner, whereby a user can readily tell what is in the content, and can select a desired content. In particular, according to the technique described in the present patent publication, for example, characteristic pictures within content are displayed by being arrayed in a primary relation, whereby the user can tell the playback positions of these pictures within the content in a list form.

Also, with Japanese Unexamined Patent Application Publication No. 2008-17041 (FIG. 13), a moving image content playback device has been described wherein, for each frame, a plurality of information relating to a face image portion which appears within the frame thereof are correlated, and when a user selects a desired face image portion, a small image of a scene where the face image portion thereof appears is displayed. This moving image content playback device described therein is configured so as to present, to the user, persons in a moving content, and the positions thereof, in a suitable and understandable manner.

Also, with Japanese Unexamined Patent Application Publication No. 2001-211408 (FIG. 24), an image playback device and so forth have been described wherein at the time of a fast forward mode, multiple thumbnails are displayed at the bottom of a screen, and also a playback bar is displayed. With the image playback device described therein, a fast forward function can be realized wherein a desired image can be searched out of a great number of recorded images over a short amount of time.

SUMMARY OF THE INVENTION

Incidentally, in the case that a desired scene is found out of moving image contents, in general, a user operates a moving image playback device to perform fast forwarding/fast rewinding playback, and finds a desired scene while viewing fast forwarding/fast rewinding playback images displayed on a display screen.

However, in the case of fast forwarding/fast rewinding, images are played in order in this fast forwarding direction or fast rewinding direction, and accordingly, the user often has to wait for a long time for the display to reach a desired scene. Also, it is generally hard to view a display image at the time of fast forwarding/fast rewinding playback, and accordingly, users often overlook desired scenes. Thus, in the event of overlooking a desired scene, the user has to perform finding of a desired scene again from the beginning.

Note combining the techniques described in Japanese Unexamined Patent Application Publication Nos. 2008-98726 (FIGS. 2) and 2001-211408 (FIG. 24) can be conceived to relieve the load of the user to some extent, but it should be said that this is still insufficient for finding a scene that the user desires readily and in a sure manner.

Particularly, for example, in the case that a moving image content is played and displayed at a personal digital assistant which a user carries around, the user is not able to constantly pay particular attention to the screen of this personal digital assistant, and in such a usage situation it is not easy to find a desired scene.

It has been found to be desirable to provide a content information processing device, a content information processing method, a content information processing program, and a personal digital assistant, which allow the user to find a desired scene in a small amount of time in a readily and sure manner while playing a moving image content.

An information processing apparatus according to an embodiment of the present invention includes a reproduction unit to reproduce video content comprising a plurality of frames; a memory to store a table including object identification information identifying an object image, and frame identification information identifying a frame of the plurality of frames that includes the object image; and a processor to extract the frame including the object image from the video content and generate display data of a reduced image corresponding to the frame for display.

The information processing apparatus may also include a user interface to receive a user selection corresponding to the object image.

The processor of the information processing apparatus may be configured to detect the object image corresponding to the object identification information from the frame when the video content is reproduced.

The processor of the information processing apparatus may be configured to generate a progress bar displaying a total playback time and a playback progress of the video content.

The processor of the information processing apparatus may be configured to populate the progress bar with a predetermined mark correlating the reduced image with the progress bar based on playback time information of the frame.

The information processing apparatus may also include a user interface configured to receive a selection corresponding to the reduced image, wherein the processor is configured to move a reproduction position of the video content to a reproduction position of the frame corresponding to the selected reduced image.

The processor of the information processing apparatus may be configured to detect the object image from each of the plurality of frames of the video content during reproduction to generate the table including object identification information identifying the object image, and the frame identification information identifying each of the plurality of frames that include the object image.

The information processing apparatus may further include a user interface configured to display an object detection window displaying a plurality of object images for selection, and receive an input corresponding to one of the plurality of displayed object images, wherein the processor is configured to extract a frame from the plurality of frames including the selected object image, and generate the display data of said reduced image from the extracted frame.

The object identification information in the table may be a keyword representing an object image, and the processor is configured to detect an object image corresponding to a keyword registered in the table from at least one of the plurality of frames during reproduction of the video content.

The processor of the information processing apparatus may be configured to extract, of a plurality of frames including the object image, a single frame representative of the plurality of frames over a predetermined time period to generate the display data.

The processor of the information processing apparatus may be configured to extract, of a plurality of frames including the object image, a frame at a time of a scene change occurring from the video content to generate the display data.

Accordingly to another exemplary embodiment, according to the present invention, includes a computer-readable recording medium including computer program instructions, which when executed by an information processing apparatus, cause the information processing apparatus to perform a method comprising: reproducing video content comprising a plurality of frames; storing a table including object identification information identifying an object image, and frame identification information identifying a frame of the plurality of frames that includes the object image; extracting the frame including the object image from the video content; and generating display data of a reduced image corresponding to the frame for display The method may further include receiving, at a user interface of the information processing apparatus, a selection corresponding to the object image.

The method may further include detecting the object image corresponding to the object identification information from the frame when the video content is reproduced.

The method may further include generating and displaying a progress bar indicating a total playback time and a playback progress of the video content.

The method may further include populating the progress bar with a predetermined mark correlating the reduced image with the progress bar based on playback time information of the frame.

The method may further include receiving a selection corresponding to the reduced image; and moving a reproduction position of the video content to a reproduction position of the frame corresponding to the selected reduced image.

The method may further include displaying an object detection window including a plurality of object images for selection; receiving an input corresponding to one of the plurality of displayed object images; extracting a frame from the plurality of frames including the selected object image; and generating the display data of said reduced image from the extracted frame.

The method may further include extracting, of a plurality of frames including the object image, a single frame representative of the plurality of frames over a predetermined time period to generate the display data.

The method may further include extracting, of a plurality of frames including the object image, a frame at a time of a scene change occurring from the video content to generate the display data.

According to the above configurations, while a moving image content is played, in the case that there are object images registered in the table within a frame of the playback moving image thereof, the object images thereof can be selected. Further, in the case that a desired object image has been selected out of these object images, the reduced image of each frame including this object image selected out of this moving image content is displayed on the screen.

With the above configurations, in the event that an object has been selected within a playback image of a moving image content, the reduced image of a frame including the object image thereof is displayed on the screen. Thus, a user can find a desired scene from a moving image content being played in a small amount of time readily and in a sure manner.

DESCRIPTION OF THE PREFERRED EMBODIMENTS

An exemplary embodiment of the present invention will be described below with reference to the drawings.

Note that, with the present embodiment, a portable telephone terminal capable of playing content data to be played along the time axis such as a moving image or the like will be exemplified as an example to which the present invention is applied, but it goes without saying that contents that will be described here are consistently an example, and the present invention is not restricted to this.

Figure 1:
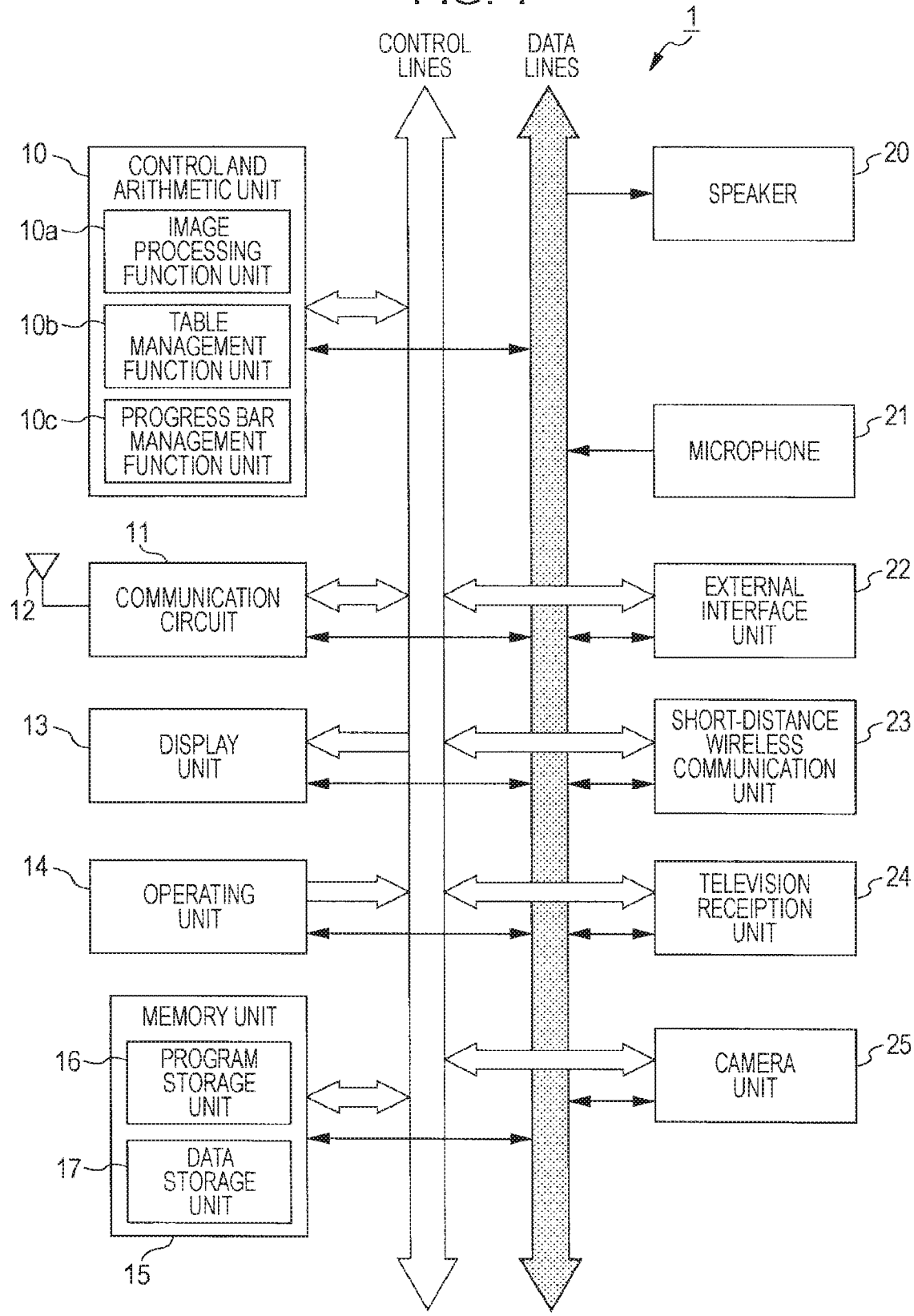
FIG. 1 is a block diagram illustrating a schematic internal configuration example of a portable telephone terminal according to an embodiment of the present invention.

FIG. 1 illustrates a schematic internal configuration example of a portable telephone terminal according to the present embodiment.

In FIG. 1, a communication antenna 12 is, for example, a built-in antenna, and performs transmission/reception of signal waves for communication such as speech, e-mail, or the like. A communication circuit 11 performs frequency conversion, modulation, demodulation, or the like of transmission/reception signals.

A speaker unit 20 is made up of a speaker for receivers, a ringer (ringtone), a speaker for output such as reproduced music or the like, and peripheral circuits thereof, provided to the portable telephone terminal. The speaker unit 20 subjects the digital audio data supplied from the control and arithmetic unit 10 to digital/analog conversion, amplifies this, converts the audio signal after amplification thereof into an acoustic wave, and output this into the air.

A microphone unit 21 is made up of a microphone for transmitting speech as well as external audio sound collection, and peripheral circuits thereof. The microphone unit 21 converts the acoustic wave into an audio signal, amplifies the input audio signal thereof, subjects this to analog/digital conversion, and transmits the audio data after analog/digital conversion thereof to the control and arithmetic unit 10.

A display unit 13 is made up of, for example, a liquid crystal panel, organic EL (Electro Luminescent) display, or the like, and peripheral circuits thereof. This display unit 13 displays various types of characters or message such as e-mail or the like on the above display, or displays various types of menu screens, a still image, a moving image, or the like, using the image signal supplied from the control and arithmetic unit 10.

The operating unit 14 is made up of various types of keys, a touch panel, and peripheral circuits thereof, provided above the casing of the portable telephone terminal according to the present embodiment. This operating unit 14 converts operating input from the user into an electric signal, amplifies the operating input signal thereof, subjects this to analog/digital conversion, and transmits the operating input data after analog/digital conversion thereof to the control and arithmetic unit 10.

An external interface unit 22 is made up of, for example, a connector for cable connection, and an interface circuit for external data communication at the time of performing data communication through a cable, or a slot for external memory in/from which external memory is inserted/detached, and an interface circuit for this external memory data communication, or the like. With the present embodiment, examples of data to be exchanged via this external interface unit 22 include the data of a moving image content. The moving image content data received via this external interface unit 22 is stored in a memory unit 15 under the control of the control and arithmetic unit 10. Note that in the case that the moving image content data obtained through this external interface unit 22 is data not subjected to compression encoding, an arrangement may be made wherein after temporarily being stored in the memory unit 15, the data thereof is read out, subjected to, for example, compression encoding or the like by the control and arithmetic unit 10 as background processing, and restored in the memory unit 15.

A short-distance wireless communication unit 23 is made up of a communication antenna for short-distance wireless radio waves such as a wireless LAN, Bluetooth (registered trademark), or the like, and a short-distance wireless communication circuit. With the present embodiment, examples of data to be exchanged via this short-distance wireless communication unit 23 include the data of a moving image content. The moving image content data received by this short-distance wireless communication unit 23 is stored in the memory unit 15 under the control by the control and arithmetic unit 10. Note that in the case that the moving image content data received through this short-distance wireless communication unit 23 is data not subjected to compression encoding, an arrangement may be made wherein after temporarily being stored in the memory unit 15, the data thereof is read out, subjected to, for example, compression encoding or the like by the control and arithmetic unit 10 as background processing, and restored in the memory unit 15.

Note that, with the present embodiment, the data of the above moving image content may be data received through the communication antenna 12 and communication circuit 11. In this case, this received moving image content data is stored in the memory unit 15 under the control of the control and arithmetic unit 10. Also, at this time, in the case that this received moving image content data is data not subjected to compression encoding, an arrangement may be made wherein after temporarily being stored in the memory unit 15, the data thereof is read out, subjected to, for example, compression encoding or the like by the control and arithmetic unit 10 as background processing, and restored in the memory unit 15.

A television reception unit 24 is made up of a reception antenna and a tuner for so-called digital television. This television reception unit 24 receives desired digital television broadcast airwaves, demodulates the received digital television broadcast airwaves, and then transmits these to the display unit 13. Thus, a digital television broadcast picture is displayed on the display screen of the display unit 13. Also, the digital television broadcast data received and demodulated at this television reception unit 24 may be stored in the memory unit 15, i.e., may be recorded. In the case of recording a digital television broadcast, it is desirable that this digital television broadcast data is stored in the memory unit 15 after being subjected to compression encoding or the like by the control and arithmetic unit 10.

A camera unit 25 is made up an imaging device for taking a still image or moving image, an optical system, and so forth, and peripheral circuits thereof. The still image data and moving image data taken by this camera unit 25 is transmitted to the control and arithmetic unit 10 to be subjected to compression encoding or the like, and is then stored in the memory unit 15.

The control and arithmetic unit 10 is made up of a CPU (Central Processing Unit), and performs communication control at the communication circuit 11, display control of the display unit 13, terminal operation control according to the operating input data of the operating unit 14, each operation control of the external interface unit 22, short-distance wireless communication unit 23, television reception unit 24, camera unit 25, and so forth, and performs arithmetic computation along therewith. Also, the control and arithmetic unit 10 performs execution of various types of control programs or application programs stored in the memory unit 15, and various types of data processing along therewith.

Now, particularly in the case of the present embodiment, the control and arithmetic unit 10 is configured so as to execute each function of the image processing function unit 10a, table management function unit 10b, and progress bar management function unit 10c.

The image processing function unit 10a uses a technique, for example, such as the MPEG4, H.264, or the like, to execute compression encoding/decompression decoding processing as to moving image content data. Also, with the present embodiment, in the case of subjecting moving image content data already subjected to compression encoding to decompression decoding for the first time, or at the time of subjecting moving image content data not subjected to compression encoding to compression encoding, the image processing function unit 10a detects an object image from each frame making up this moving image. Note that the details of detection processing of this object image will be described later.

The table management function unit 10b generates an object search table that correlates the identification information of an object image detected by the image processing function unit 10a, the identification information of a frame including the object image (specifically, frame number), and playback time information of this frame (timestamp information), and manages this. Also, in the case that the data of an object search table has already been accompanied with moving image content data received through the external interface unit 22, short-distance wireless communication unit 23, communication circuit 11, or the like, the table management function unit 10b manages the moving image content data and the object search table data in a correlated manner. The details of the object search table will be described later.

While moving image content data is played by the image processing function unit 10a, the progress bar management function unit 10c displays a progress bar on the screen of the display unit 13 based on the total playback time information of the moving image content data thereof, and the playback progress of this moving image content. Note that the details of the total playback time information, playback progress, and progress bar will be described later.

Also, with the present embodiment, in the case that a moving image content being played has been registered in the above object search table, the image processing function unit 10a refers to each of the object identification information within this table to extract each frame including an object image corresponding each of the object identification information out of the moving image content data thereof. Also, in the case that an object image has been selected from the display image of the moving image content being played, the image processing function unit 10a may extract a frame corresponding to the object identification information of this selected object image out of this moving image content data by referring to the above object search table. Subsequently, the image processing function unit 10a generates a reduced image by resizing the image of this extracted frame. The progress bar management function unit 10c at this time displays this reduced image in the vicinity of the progress bar on the screen in a manner correlated with the playback execution time of a frame serving as the basis thereof. Also, at this time, in the case that a reduced image displayed on the screen has been selected, or a playback position corresponding to this selected reduced image above the progress bar has been specified, the image processing function unit 10a moves the playback position of the moving image content to a frame corresponding to this reduced image. Note that the details of selection of the object image, generation of a reduced image, display of this reduced image, movement of a playback position, and so forth will be described later.

The memory unit 15 is made up of built-in memory provided to the inside of this terminal, and detachable card-shaped memory in which so-called SIM (Subscriber Identity Module) information or the like is stored. The built-in memory is made up of ROM (Read Only Memory) and RAM (Random Access Memory). This ROM stores an OS (Operating System), a control program for the control and arithmetic unit 10 controlling each unit, various types of initialized values, dictionary data, sound data such as ringtones, key stroke sounds, and so forth, various types of application programs, and so forth. This ROM includes rewritable ROM such as NAND-type flash memory or EEPROM (Electrically Erasable Programmable Read-Only Memory), and is configured so as to save e-mail data, data of a telephone book or mail address book, data of a still image or moving image content, data of the object search table, and in addition thereto, various types of user set values, and so forth. The RAM stores occasional data as a work area or buffer area at the time of the control and arithmetic unit 10 performing various types of data processing.

Note that, with the example in FIG. 1, of storage regions included in the memory unit 15, only a program storage unit 16 and a data storage unit 17 are illustrated. In the case of the present embodiment, the moving image content data, object search table data, and so forth are stored in the data storage unit 17. Also, in the case of the present embodiment, a content information processing program for the control and arithmetic unit 10 executing each function of the image processing function unit 10a, table management function unit 10b, and progress bar management function unit 10c is also stored in the program storage unit 16 as one of multiple application programs. Note that each of the image processing function unit 10a, table management function unit 10b, and progress bar management function unit 10c may be realized by hardware.

Additionally, the portable telephone terminal according to the present embodiment also includes components provided to a common portable telephone terminal such as an LED (Light Emitting Diode) for key lighting or incoming light or the like, and a driving unit thereof, a non-contact communication processing unit including a non-contact IC card function and a reader/writer function, a GPS (Global Positioning System) communication unit, a timer (clock unit), a charge control unit, a battery, and so forth.

Description will be made below regarding detection of an object image, and details of the object search table.

As described above, for example, when subjecting moving image content data after compression encoding to decompression decoding for the first time, or when subjecting moving image content data before compression encoding to compression encoding, the image processing function unit 10a detects an object image from a frame making up this moving image. Subsequently, the table management function unit 10b generates an object search table that correlates the identification information of an object image detected from this moving image content with the frame number including this object image, and playback time information thereof.

Now, with the present embodiment, the term "object image" means an image area to be recognized as a part of object by an image recognition and analysis technique within each frame making up a moving image. Specifically speaking, the image processing function unit 10a detects each of image areas to be recognized and analyzed as a part of object within each frame making up a moving image, for example, such as "persons", "airplanes", "bicycles", "trees", "houses", and so forth, as an object image. Note that various techniques are already available with the related art for an image recognition and analysis technique for detecting an object image, and with an embodiment of the present invention any technique may be employed. Also, with the present embodiment, a frame from which an object image may be detected is a synchronous frame such as an intra frame (I frame) stipulated, for example, by MPEG4 or H.264. That is to say, a synchronous frame from which an object image is detected is a frame that can make up one display image using only the data of the frame thereof. Note that in the case that each frame can make up one display image such as a frame of so-called motion JPEG, the image processing function unit 10a may detect an object image from each frame thereof.

Figure 2:
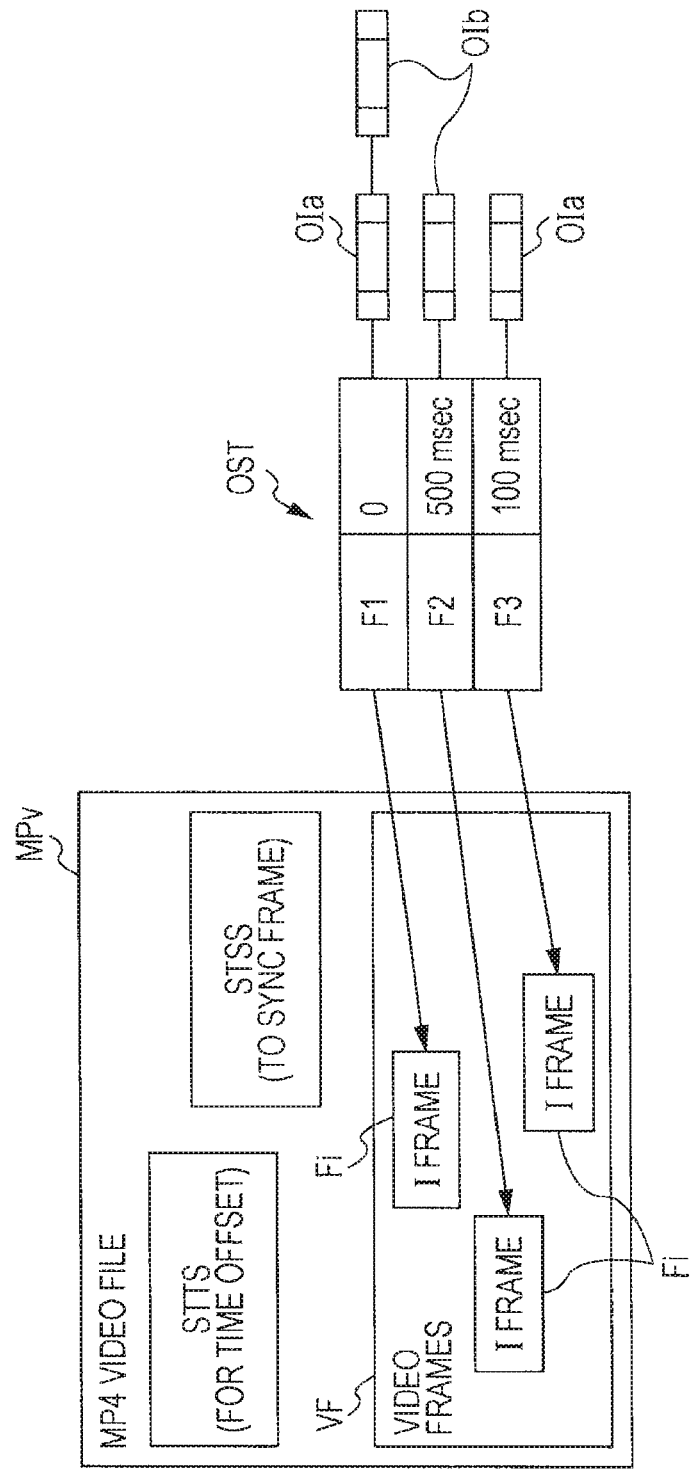
FIG. 2 is a diagram to be used for detailed description of a moving image content file and an object search table.

Also, with the present embodiment, an object search table OST is, such as illustrated in FIG. 2, a table that correlates object identification information, a frame number, and timestamp information. This object search table OST is stored in the memory unit 15 in a manner correlated with a moving image content file MPv by the table management function unit 10b. Note that frames making up a moving image content are arrayed in the order of frame numbers in order of time, and in the case that the temporal position of each frame within the moving image content can be determined by the frame numbers, for example, time information such as the above timestamp information is not necessarily registered in the object search table OST.

The above object identification information is information for determining each of the object images detected from a moving image content. Also, with the present embodiment, of objects detected from a moving image content, object images recognized as the same object images at the time of the above image recognition and analysis are appended with the same object identification information. In the case of the present embodiment, this object identification information is determined to be a keyword specifically representing the object thereof as an example. Specifically, for example, keywords representing object identification information are text data such as "person", "airplane", "bicycle", "tree", "house", and so forth. It goes without saying that common numerals or codes or the like may be employed as object identification information.

The above frame numbers are frame identification information for identifying each frame within a moving image content, and are numbers assigned to each frame within this moving image content. In the case of exemplifying a MPEG4 moving image content file as an example, the frame numbers thereof are frame numbers stored in STSS (Sample Table Sync Sample atom) stipulated by the MPEG4.

The above timestamp information is, in the case of exemplifying a MPEG4 moving image content file as an example, frame playback time information stored in STSS (Sample Table Sync Sample atom) stipulated by the MPEG4.

Specifically, in the case of exemplifying the MPEG4 as an example, the file MPv of a moving image content is configured, such as illustrated in FIG. 2, so as to include the above STTS and STSS, and a video frame VF. The above STTS stores the values of a total number of frames, playback time of one frame, and a timescale/frame rate, and the above STSS stores the values of a total number of synchronous frames, and each frame number. The above video frame VF stores each frame of a moving image content, of which the I frame Fi is a synchronous frame. Thus, with the moving image content file MPv of the MPEG4, various types of video information are managed with atom information, and access to the above synchronous frame can be performed by direct access with reference to the information of "STSSatom".

Accordingly, in the case of exemplifying the above MPEG4 moving image content, the frame number of the above STSS that enables direct access to each frame, and the frame playback time of the above STTS as timestamp information that can be used for display corresponding to the time axis of the progress bar, are stored in the above object search table OST. Also, the above object identification information is stored in this object search table OST in a manner correlated with these frame number and timestamp information. Specifically, such as illustrated in FIG. 2, each frame number where the corresponding object has been detected, and playback time from the head of the moving image content at each frame thereof are stored in the object search table OST, and subsequently, identification information OIa, OIb, and so on of the objects detected from each frame thereof are stored in a manner correlated with the frame number thereof. Note that FIG. 2 illustrates an example wherein object information OIa and OIb are correlated with the synchronous frame of a frame number "F1" of which the playback time from the head of the moving image content is "0 msec", object information OIb is correlated with the synchronous frame of a frame number "F2" of which the playback time from the head of the moving image content is "500 msec", and object information OIa is correlated with the synchronous frame of a frame number "F3" of which the playback time from the head of the moving image content is "100 msec".

Next, with the portable telephone terminal 1 according to the present embodiment, a progress bar and reduced images to be displayed on the display screen of the display unit 13 will be described with reference to FIGS. 3 through 8.

Figure 3:
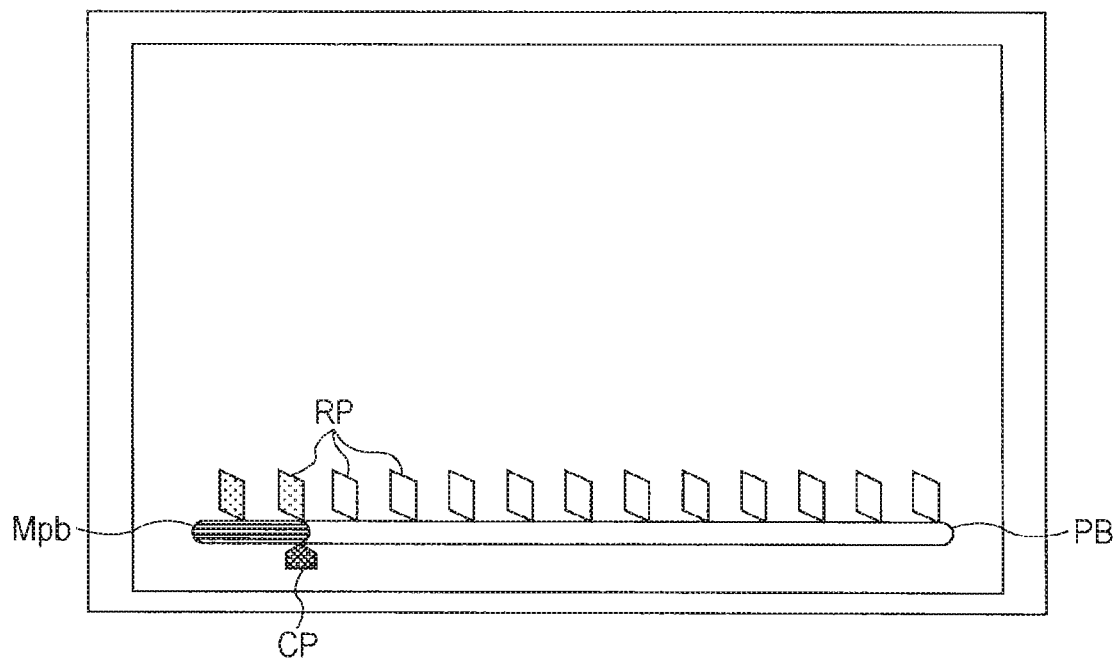
FIG. 3 is a diagram illustrating a basic display example of a display screen at the time of a moving image content being played.

FIG. 3 illustrates a basic display example of the display screen at the time a moving image content being played.

As illustrated in this FIG. 3, while the moving image content is played, the playback image of the moving image content thereof, and also a progress bar PB and reduced images RP are displayed.

The progress bar PB has a bar shape that is long in the horizontal direction of the display screen as an example, and the length in the lateral direction on the screen of the bar thereof corresponds to total playback time used for playing this moving image content data from the beginning to the end. Also, with this progress bar PB, an indicator according to the current playback position of the moving image content, i.e., an indicator Mpb for displaying the playback progress of this moving image content is displayed. The progress bar management function unit 10c creates the display image data of these progress bar PB and the indicator Mpb based on the above total playback time information, and the information of playback progress. Also, a cursor CP indicating the current playback position is displayed on, for example, the left edge of the indicator Mpb in the drawing. This playback position cursor CP is configured so as to move to an arbitrary position on the progress bar PB by the user. In the case that this playback position cursor CP has been moved to the user's desired portion on the progress bar PB, the playback position (playback time) of the moving image content is moved to a position (playback time) corresponding to the playback position cursor CP after movement thereof.

The reduced images RP are images wherein the image of a frame corresponding to each frame number registered in the object search table OST is resized and reduced. The reduced images RP are displayed, for example, in the vicinity of the upper side of the screen of the progress bar PB by being arrayed in the order matched with the playback time of the corresponding frame. Note that the display interval on the screen of the reduced images RP may be an equal interval, or may be an interval matched with the playback time of the corresponding frame. In either case, the number of the reduced images RP to be displayed on the screen is determined while taking the size of the screen of the display unit 13, and the viewability of the reduced images, into consideration. However, the display order of the reduced images RP is coordinated with the playback order of the corresponding frame. FIG. 3 illustrates an example wherein the reproduced images RP are displayed on the screen with an equal interval.

The image processing function unit 10a creates the display image data of the reduced images RP based on the data of the object search table OST at the time of playback of this moving image content being started. That is to say, the image processing function 10a creates each reduced image RP from the frame of each frame number registered in the object search table OST regarding this moving image content. Subsequently, the generated reproduced images RP are displayed in the vicinity of the progress bar PB in an array by the progress bar management unit 10c.

Now, for example, in the case that all of the reduced images RP are not displayable on one screen in an array for the reason that the total number of the reduced images RP is too many, or the like, the image processing function unit 10a generates only the reduced images RP matched with predetermined conditions, and the progress bar management function unit 10c displays the reduced images RP generated based on these predetermined conditions in the vicinity of the progress bar PB in an array.

With the present embodiment, examples of the above predetermined conditions include a delimiter point for every certain period, and an occurrence point of scene change.

Specifically, in the case that a delimiter point for every certain period is employed as the above predetermined condition, the image processing function unit 10a generates only the reduced images RP corresponding to a frame presented at each delimiter point for every certain period, and the progress bar management function unit 10c displays these reduced images RP on the screen in an array. Note that in the case that a frame accurately matched with a condition of a delimiter point for every certain period has not been registered in the object search table OST, the image processing function unit 10a generates reduced image RP of a frame near that frame registered in the object search table OST.

Also, in the case of employing an occurrence point of scene change as the above predetermined condition, with the occurrence point of this scene change, the image processing function unit 10a generates, for example, only the reduced image RP corresponding to the first frame of this scene. Note that in the case that no frame matched with the condition of an occurrence point of this scene change has been registered in the object search table OST, the image processing function unit 10a generates the reduced image RP of a frame registered in the object search table OST after an occurrence point of this scene change.

Note that the two conditions of the above certain period and scene change may be employed as a combination of both, or may be employed separately, and being switched as appropriate by the user's selection or automatic selection of the terminal or the like. Also, the time interval of the certain period may be changed as appropriate by the user's selection or automatic selection of the terminal or the like.

Also, with the present embodiment, the reduced images RP displayed on the screen such as described above are configured so as to be selected by the user. With the present embodiment, in the case that one of the reduced images has been selected by the user, the playback position (playback time) of the moving image content is moved to the playback position (playback time) of the frame corresponding to the selected reduced image RP. Note that selection of the reduced image RP at the time of moving the playback position is performed at the time a predetermined selection instruction such as clicking or the like after moving the cursor for selection instruction above the reduced image RP.

Figure 4:
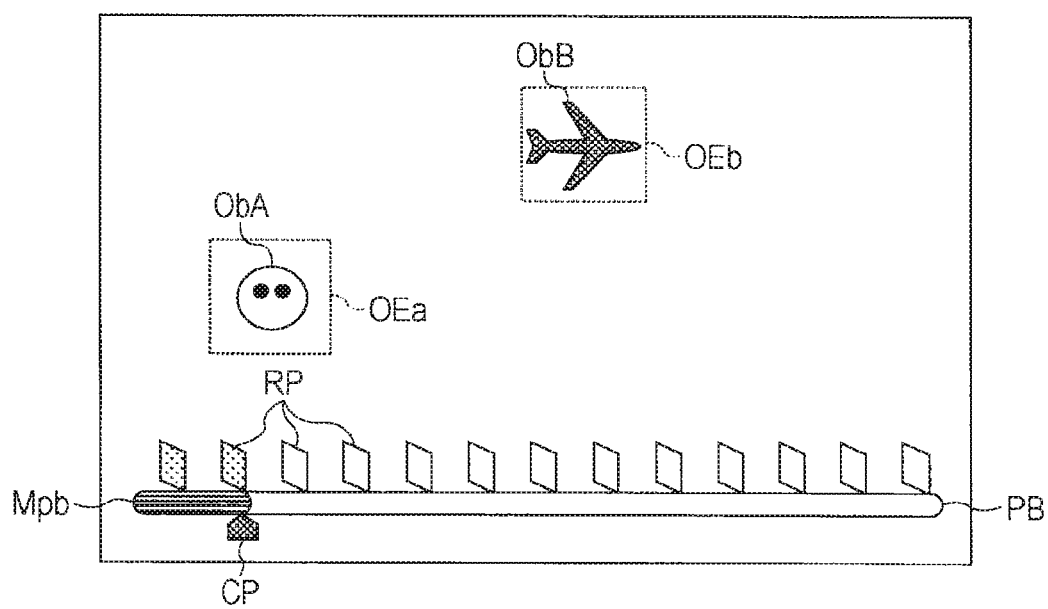
FIG. 4 is a diagram illustrating a specific screen display example in the case that a moving image content registered in the object search table is played and displayed.

FIG. 4 illustrates a specific image display example in the case of a moving image content already registered in the object search table OST being played and displayed such as described above.

With the present embodiment, in the case of the above moving image content being and displayed, the image processing function unit 10a executes detection processing regarding whether or not there is an object image corresponding to the object identification information registered in the object search table OST within the image now being played. Subsequently, upon detecting an object image registered in the object search table OST within the image now being played, the image processing function unit 10a adds, such as illustrated in FIG. 4, object detection windows OEa and OEb to object images ObA and ObB detected within the image now being played, respectively.

The object detection windows OEa and OEb may be a somewhat wide window so as to cover the detection object images ObA and ObB such as illustrated in the example in FIG. 4, or a window having generally the same shape and size as those of the detection object images ObA and ObB. These object detection windows OEa and OEb are windows for clearly indicating that the object images ObA and ObB thereof have been detected based on the object search table OST, i.e., are objects registered in the table OST. With the present embodiment, in order to clearly indicate that the object images ObA and ObB are images that have been detected above, the image processing function unit 10a subjects the object window detection objects OEa and OEb to predetermined visualization processing. Examples of this predetermined visualization processing include processing such as tinting or color change to a window, adding an image frame to a window, enhancement thereof, semi-transparency of a window, and so forth.

Also, with the present embodiment, the object images ObA and ObB to which the object detection windows OEa and OEb are added can be selected by a selection instruction from the user, or a predetermined automatic selection instruction, or the like.

Selection of the object images ObA and ObB by the user's selection instruction is, in the case that a touch panel is provided to the whole screen of the display screen for example, performed when the user touches the object detection windows OEa and OEb on the screen in FIG. 4, or the like. Also, with the present embodiment, selection of the object images ObA and ObB by the user's selection instruction is also performed when the user directly inputs the above keyword text (object identification information) registered in the object search table OST corresponding to the object images ObA and ObB thereof. That is to say, the control and arithmetic unit 10 determines that the object images ObA and ObB have been selected by the user at the time of the touch panel area corresponding to the object detection windows OEa and OEb being touched, or at the time of the keyword text corresponding to the object images ObA and ObB being input. In addition thereto, an arrangement may be made wherein attribute information relating to the object images is added to a keyword, and selection by this attribute can be made instead of selection by the keyword or along therewith. Also, selection of the object images by the user's selection instruction may be performed at the time of a predetermined selection instruction, for example, such as clicking or the like after moving the cursor for selection instruction onto the object detection windows. Further, for example, in the case that another object image has been registered in the object search table OST in a manner correlated with the object images ObA and ObB, at the time of the object images ObA and ObB or the like being selected, this other object image may be handled to have been selected at the same time. Note that in the case that object selection is performed by touching of the object detection windows OEa and OEb such as described above, it is desirable that the object detection windows OEa and OEb are somewhat wide areas. That is to say, according to the somewhat wide areas OEa and OEb, selection of the object images ObA and ObB is readily performed.

On the other hand, as for the above automatic selection instruction, it can be conceived to automatically select the object images ObA and ObB detected on the screen, or to automatically select, at the time of an object image already selected and registered being detected, the object image thereof, or the like.

With the present embodiment, such as described above, at the time of a moving image content being played and displayed, in the case of selection of the object images being performed, the image processing function unit 10a generates only the reduced image RP of a frame including an object image matched with or relating to the selected object image. That is to say, the image processing function unit 10a at this time searches for a frame corresponding to the selected object image from the object search table OST, and generates only the reduced image RP of the frame thereof.

Subsequently, the progress bar management function unit 10c displays the reduced images RP generated based on the selected object image in the vicinity of the progress bar PB in an array. That is to say, in other words, the reduced images RP to be displayed at this time in the vicinity of the progress bar PB in an array are images for informing the user in which temporal position within the moving image content the frame including the selected object image exists.

Also, with the present embodiment, in order to comprehensively inform the user in which temporal position within the moving image content a frame corresponding to the reduced image RP exists, the progress bar management function unit 10c at this time displays the reduced images RP and the playback positions on the progress bar PB in a correlated manner.

Description will be made below in detail regarding a display example wherein the reduced images RP are correlated with the playback positions on the progress bar PB, with reference to FIGS. 5 through 7.

Figure 5:
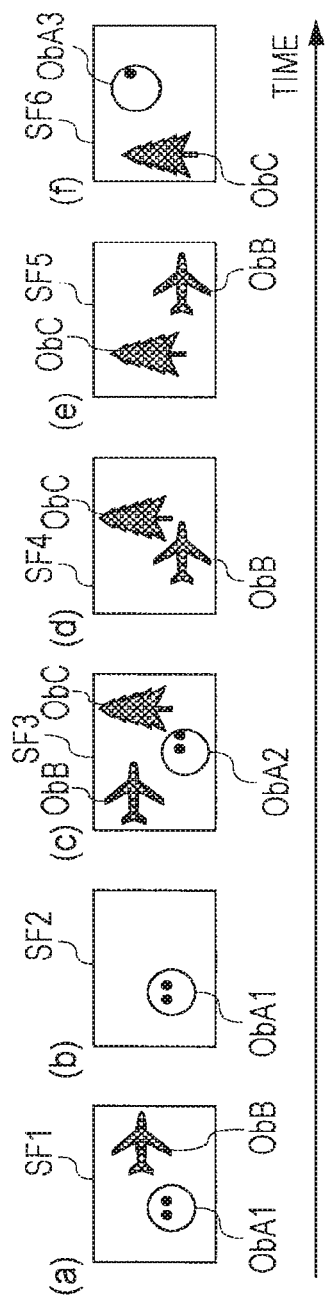
FIG. 5 is a diagram illustrating each frame example searched from a moving imager content with reference to the object search table based on an object image in FIG. 4.

For example, let us say that frames that can be searched from the object search table OST based on the object images ObA and ObB in FIG. 4 are six search frames SF1 through SF6 such as illustrated in (a) through (f) in FIG. 5. Specifically, let us say that there are search frames SF1, SF2, SF3, and SF6 in FIG. 5 as frames that can be searched from the object search table OST based on the object ObA, and similarly, there are search frames SF1, SF3, SF4, and SF5 in FIG. 5 as frames that can be searched from the object search table OST based on the object ObB. Note that, with the present embodiment, for example, even though the sizes of images, and image components are not completely matched and somewhat differ such as object images ObA1, ObA2, and ObA3 in FIG. 5, in the event that these are recognized to be the same objects, these are handled as the same objects. Description will be made later regarding the details of processing at the time of determining, even though the sizes and components of images somewhat differ, these to be the same objects.

Figure 6:
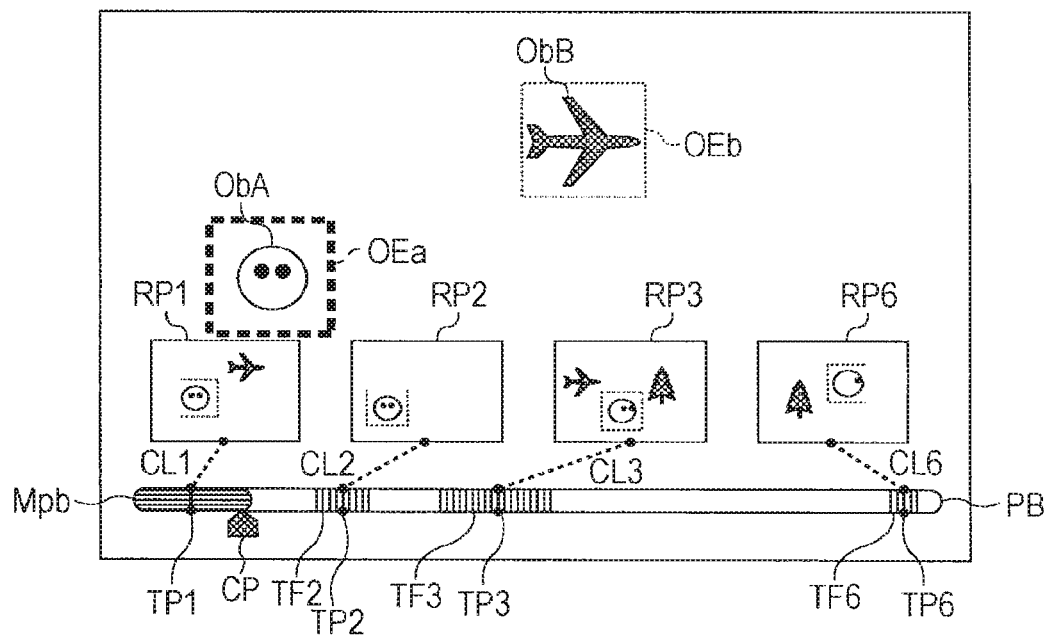
FIG. 6 is a diagram to be used for description of a reduced image example of each frame searched by the object image of a person's face being selected.

Now, for example, if we say that the object image ObA has been selected such as illustrated in FIG. 6, the table management function unit 10b determines the frames SF1, SF2, SF3, and SF6 by searching for the object search table OST based on the identification information of the object image ObA. The image processing function unit 10a at this time generates the reduced images RP1, RP2, RP3, and RP6 corresponding to the frames SF1, SF2, SF3, and SF6, such as illustrated in FIG. 6. Also, the progress bar management function unit 10c displays the reduced images RP1 through RP3, and RP6 in the vicinity of the progress bar PB in an array.

Figure 7:
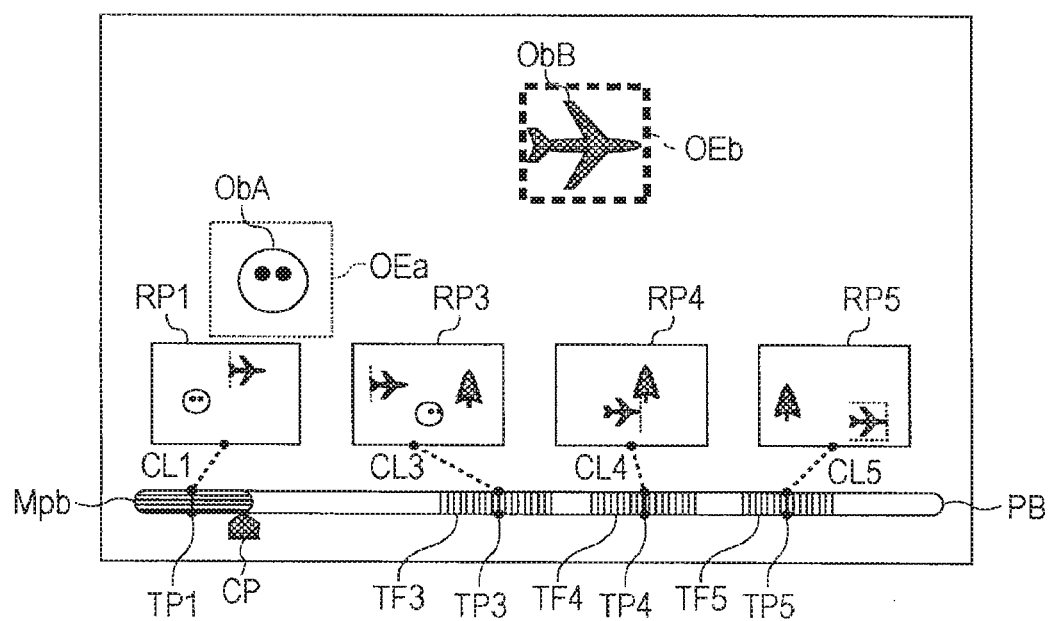
FIG. 7 is a diagram to be used for description of a reduced image example of each frame searched by the object image of an airplane being selected.

Similarly, for example, if we say that the object image ObB has been selected such as illustrated in FIG. 7, the table management function unit 10b determines the frames SF1, SF3, SF4, and SF5 by searching for the object search table OST based on the identification information of the object image ObB. The image processing function unit 10a at this time generates the reduced images RP1, RP3, RP4, and RP5 corresponding to the frames SF1, SF3, SF34 and SF5 such as illustrated in FIG. 7. Also, the progress bar management function unit 10c displays the reduced images RP1, RP3 through RP5 in the vicinity of the progress bar PB in an array.

Also, at this time, the progress bar management function unit 10c recognizes in which temporal position within the moving image content the frames SF exist, based on the timestamp information of the object search table OST, and displays the reduced images RP in a manner correlated with the temporal positions. As an example, such as illustrated in FIGS. 6 and 7, the progress bar management function unit 10c displays time point marks TP representing the playback point in time of the frame SF corresponding to a reduced image RP on the progress bar PB. Also, the progress bar management function unit 10c also displays connecting line marks CL for connecting a time point mark TP on the progress bar PB, and the corresponding reduced image RP. That is to say, in the case of the example in FIG. 6, time point marks TP1, TP2, TP3, and TP6 representing the playback points in time of the frames SF1 through SF3, and SF6 corresponding to the reduced images RP1 through RP3, and RP6 respectively are displayed, and also connecting line marks CL1, CL2, CL3, and CL6 for connecting the time point marks TP1 through TP3, and TP6, and the reduced images RP1 through RP3, and RP6 respectively are displayed. Similarly, in the case of the example in FIG. 7, the time point marks TP1, and TP3 through TP5 corresponding to the reduced images RP1, and RP3 through RP5 respectively are displayed, and also the connecting line marks CL1, and CL3 through CL5 are displayed. In the case of the present embodiment, the colors and designs of the time point marks and connecting line marks are configured so as to be visually understandable.

Also, in the case that all of the reduced images RP are not displayable due to a reason that the number of frames searched from the object search table OST based on the selected object image is too many, or the like, the progress bar management function unit 10c displays detection frame marks TF representing the temporal position of a frame of which the reduced image is not displayable, on the progress bar PB. These detection frame marks TF are represented with multiple line displays corresponding to the temporal positions of frames, and are in the case that frames are close in time, represented with area display including these adjacent frames, or the like. That is to say, in the case of the example in FIG. 6, the detection frame marks TF1, TF2, TF3, and TF6 are displayed on the progress bar PB to display a frame of which the reduced image RP is not displayable. Similarly, in the case of the example in FIG. 7, the detection frame marks TF1, TF3, TF4, and TF5 are displayed on the progress bar PB to display a frame of which the reduced image RP is not displayable. Note that in the case that the area display including the adjacent frames is employed, when there is a portion where frames are crowded in time, or a temporally sparse portion within the area thereof, such a crowded or sparse portion may be represented with colored gradation or the like, for example. Specifically, for example, the crowded portion is represented with a deep color, and the sparse portion is represented with a light color. Also, in such a case where all of the reduced images RP are not displayable, frames represented with the time point marks TP, i.e., frames representing the reduced images RP may be determined, in the same way as described above, based on a predetermined condition such as a delimiter point for every certain period, an occurrence point of scene change, or the like.

Note that movement of the playback position due to movement of the playback position cursor CP may be performed at the time of the playback position cursor CP being moved above the user's desired time point mark TP or detection frame mark TF. That is to say, in this case, the playback position of the moving image content is moved to the playback position corresponding to the time point mark TP or detection frame mark TF specified by the playback position cursor CP.

With the present embodiment, the examples in FIGS. 6 and 7 illustrate a case where a desired object image has been selected from the playback images of the moving image content, but the number of objects that can be selected from this playback image is not restricted to one.

Figure 8:
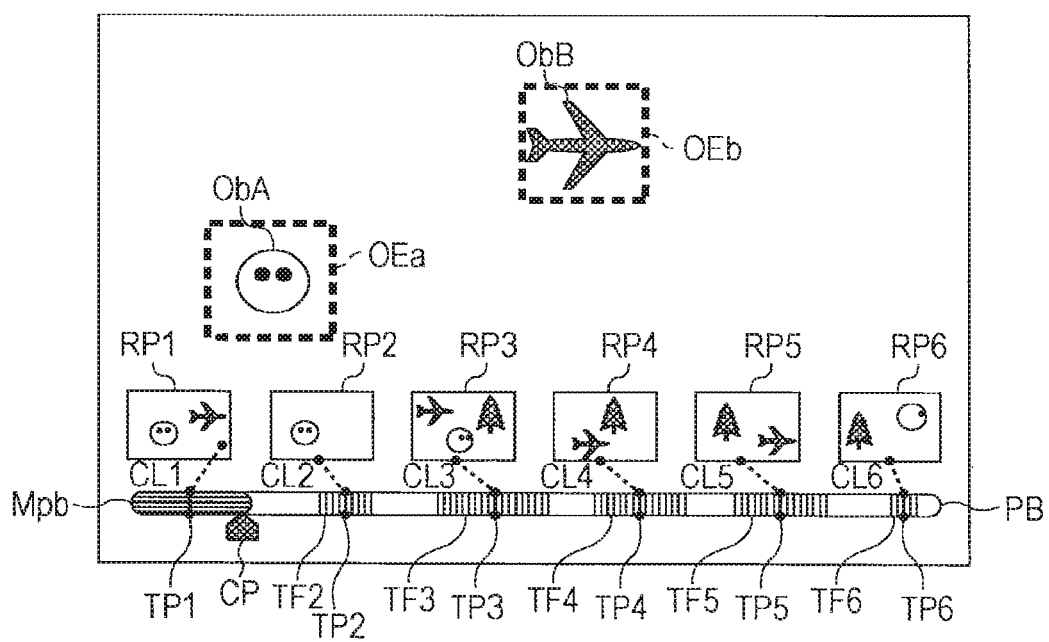
FIG. 8 is a diagram to be used for description of a reduced image example of each frame searched by the two object images of a person's face and an airplane being selected out of playback images of a moving image content.

FIG. 8 illustrates a display example in the case that two of the object images ObA and ObB have been selected out of the playback images of the moving image content, for example.

That is to say, such as illustrated in the example in FIG. 8, in the case that the object images ObA and ObB have been selected, the table management function unit 10b determines the frames SF1 through SF6 in FIG. 8 by searching for the object search table OST based on the identification information of the object images ObA and ObB. The image processing function unit 10a in this case generates, such as illustrated in FIG. 8, reduced images RP1 through RP6 corresponding to the frames SF1 through SF6. Also, the progress bar management function unit 10c displays these reduced images RP1 through RP6 in the vicinity of the progress bar PB in an array. Also, in the case of the example in FIG. 8 as well, in the same way as described above, the time point marks TP1 through TP6 and connecting line marks CL1 through CL6 corresponding to the reduced images RP1 through RP6 are displayed above the progress bar PB. Further, in the same way as described above, in the case that the number of frames searched from the object search table OST based on the selected object images ObA and ObB is too many, and all of the reduced images RP are not displayable, the detection frame marks TF1 through TF6 are displayed on the progress bar PB.

Next, description will be made regarding processing at the time of the image processing function unit 10a determining, even though the sizes of object images, or components making up the object images, or the like somewhat differ, these objects to be the same object image, with reference to FIGS. 9 through 12.

A moving image content is configured of multiple temporally consecutive frames. Subsequently, the playback display of this moving image content is performed by displaying each frame thereof in order of time, and according to the direction and size of an object image within each frame to be displayed in order of time gradually changing, movement of such an object is expressed on the display screen.

With the image recognition and analysis technique according to the related art, for example, in the case that there are several object images represented with the same "person" or the same "airplane" or the like, at the time of the size of each object image, the shape, position, number or the like of a component of each object image changing, these are detected as different images.

Figure 9:
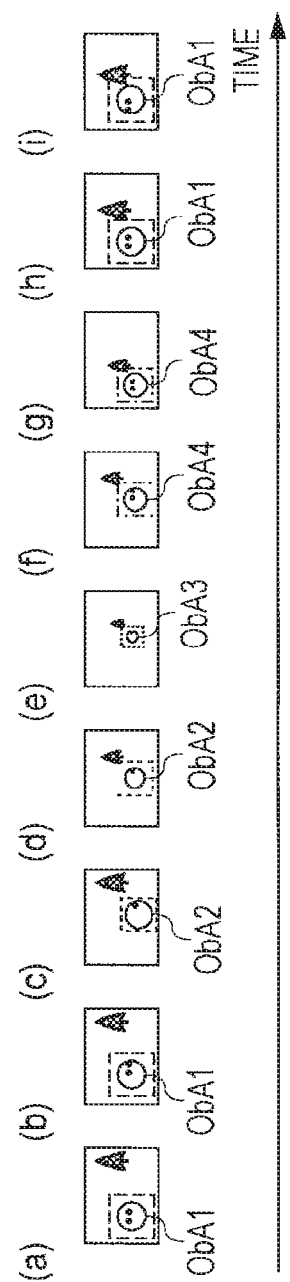
FIG. 9 is a diagram illustrating an example of each object image to be recognized as a different object image by an image recognition and analysis technique according to the related art.

That is to say, for example, such as illustrated in (a) through (i) in FIG. 9, in the case that the object image ObA representing the same person's face is included in each frame, at the time of both images differing such as object images ObA1 and ObA4, the image recognition and analysis technique according to the related art recognizes the object images ObA1 and ObA2 to be different images. Similarly, at the time of both images differing such as object images ObA2 and ObA3, the image recognition and analysis technique according to the related art recognizes the object images ObA2 and ObA3 to be different images. Also, for example, in the event that the number of image portions of "eye" that is one of the components of an object image differs, the image recognition and analysis technique according to the related art recognizes the object images ObA1 and ObA2 to be different images. That is to say, in the case of the example in FIG. 9, regardless of the object images ObA1 through ObA4 being object images representing the same person's face, the image recognition and analysis technique according to the related art recognizes the object images to be different images.

In order to handle such a situation, the portable telephone terminal 1 according to the present embodiment can determine, even though the sizes, components, or the like of multiple object images representing the same "person" or the like differ, these to be the same object image by taking advantage of a motion prediction technique for moving images.

Therefore, the image processing function unit 10a of the control and arithmetic unit 10 also detects, at the time of detection of an object image, each component (hereafter, referred to as "sub object image") making up the object image thereof.

Figure 10:
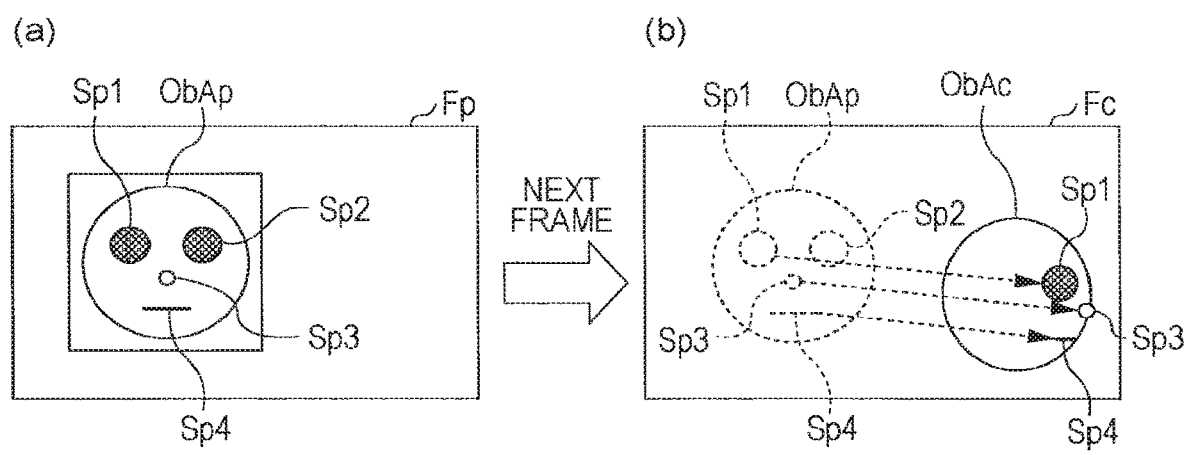
FIG. 10 is a diagram to be used for description of processing for recognizing as the same object image even though the size or a component differs with the embodiment.

For example, such as illustrated in (a) in FIG. 10, in the event of having detected an object image ObAp from a certain processing object frame Fp image, the image processing function unit 10a also detects sub object images Sp1 through Sp4 making up the object image ObAp simultaneously. Also, such as illustrated in (b) in FIG. 10, in the event of having detected an object image ObAc from the next processing object frame Fc, the image processing function unit 10a also detects sub object images Sp1, Sp3, and Sp4 making up the object image ObAc simultaneously. Subsequently, such as illustrated in (b) in FIG. 10, the image processing function unit 10a confirms, based on motion vector information from the object image ObAp to the object image ObAc between both processing object frames Fp and Fc, the movement destination of the sub object images Sp1 through Sp4 of the object image ObAp.

Subsequently, for example, in the event that all of the sub object images are assembled of the object images of both processing object frames, even though the sizes of the object images of both processing object frames differ for example, the image processing function unit 10a according to the present embodiment subsequently handles these as the same object image. Also, with the object images of both processing object frames, even though a portion of each sub object image is eliminated or increased, and the shapes thereof change, in the event that the amount of the elimination or increase, and shape change is included in a predetermined certain allowable range, the image processing function unit 10a handles these as the same object image. In the case of the example in FIG. 10, the sub object image of the object image ObAc of the processing object frame Fc is partially eliminated as compared to the object image ObAp of the processing object frame Fp, but the number of eliminations is included in a predetermined certain allowable range. Accordingly, the image processing function unit 10a handles the object images ObAp and ObAc as the same object image.

Figure 11:
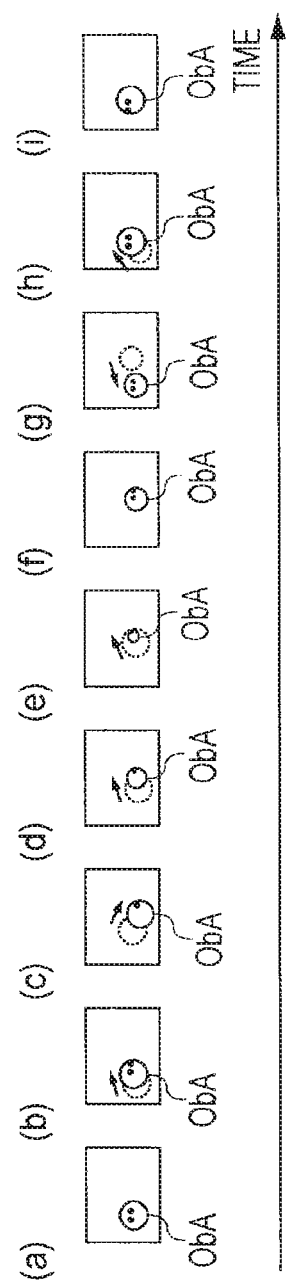
FIG. 11 is a diagram illustrating each object image to be recognized as the same object image even though the size or a component differs with the embodiment.
Figure 12:
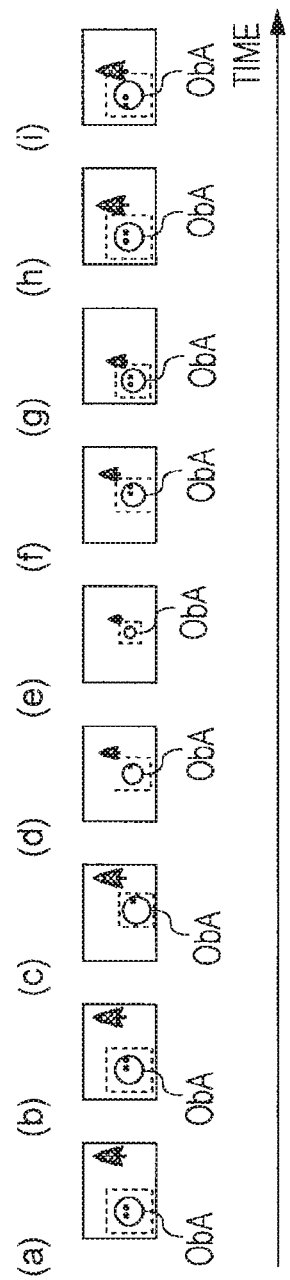
FIG. 12 is a diagram to be used for description of each object image recognized as the same object image even though the size or a component differs with the embodiment.

Specifically, with the present embodiment, for example, such as illustrated in (a) through (i) in FIG. 11, the image processing function unit 10a confirms, based on the motion vector information of the object images ObA detected within processing object frames arrayed in order of time for example, the movement destination of the subject images within the object images ObA. Subsequently, in the event that the change amount of the number or shape or the like of sub object images is included in a certain allowable range of the object images ObA of the processing object frames, such as illustrated in (a) through (i), the image processing function unit 10a handles the object images ObA of the processing object frames as the same object image.

Thus, the control and arithmetic unit 10 according to the present embodiment confirms, based on the motion vector of an object image, the movement destination of the sub object images, and also has enhanced tolerance as to change in the size or components of the object image by setting a certain allowable range as to change in the sub object images thereof.

Note that the control and arithmetic unit 10 according to the present embodiment is configured, as described above, so as to determine multiple object images of which the sizes or a part of components or the like differ to be the same object image. Accordingly, for example, at the time of displaying reduced images in the vicinity of the progress bar in an array, reduced images including object images of which the sizes or components somewhat change may be arrayed instead of arraying reduced images including object images of which the sizes or components are completely the same.

Figure 13:
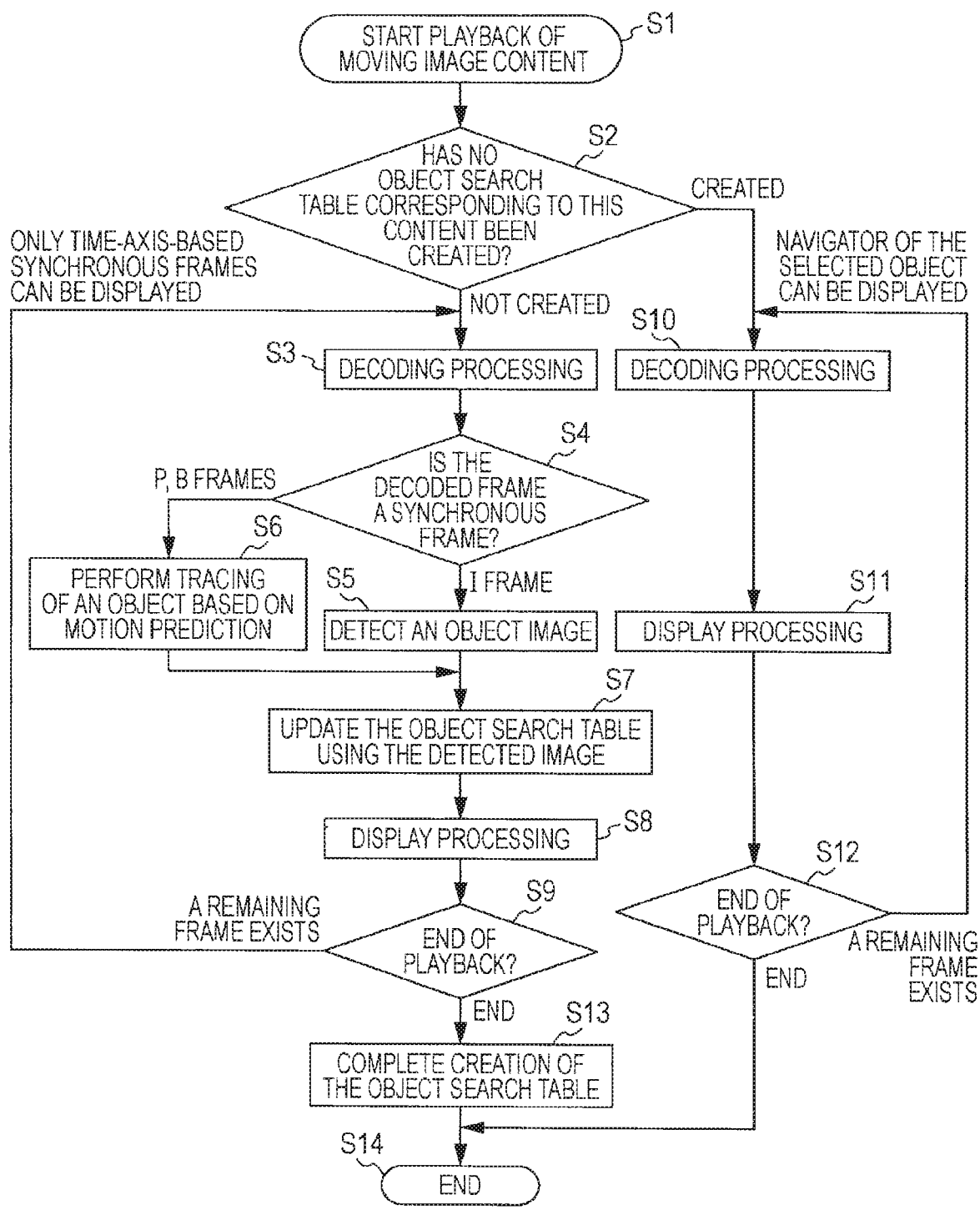
FIG. 13 is a flowchart illustrating the time of a control and arithmetic unit executing detection of an object, creation of an object search table, generation and display of a reduced image and a progress bar using a content information processing program.

FIG. 13 illustrates a processing flow at the time of the control and arithmetic unit 10 executing detection of an object, creation of an object search table, and generation and display of reduced images and a progress bar in the event that decoding of a moving image content is performed at the portable telephone terminal 1 according to the embodiment of the present invention.

In FIG. 13, first, as step S1, when the image processing function unit 10a starts playback of a moving image content, the table management function unit 10b determines as processing in step S2 whether or not the object search table has already been created as to the moving image content thereof. Subsequently, the table management function unit 10b informs the image processing function unit 10a of the determination result thereof.

Upon receiving notice to the effect that the object search table has not been created from the table management function unit 10b, the image processing function unit 10a proceeds to step S3 to start decoding processing of the moving image content. Also, upon receiving notice to the effect that the object search table has been created from the table management function unit 10b, the image processing function unit 10a proceeds to step S10 to start decoding processing of the moving image content.

In the case of having proceeded to the processing in step S3 to start decoding processing, the image processing function unit 10a determines as processing in step S4 whether the decoded frame is the synchronous frame or a frame other than the synchronous frame. Specifically, for example, in the case of decoding by the MPEG4, the image processing function unit 10a determines whether the decoded frame is an I frame or P (or B) frame.

Subsequently, in the event that determination is made in step S4 that the decoded frame is a synchronous frame (I frame), the image processing function unit 10a advances the processing to step S5, detects an object image such as described above, and advances the processing to step S7. On the other hand, in the event that determination is made that the decoded frame is not a synchronous frame (P (or B) frame), the image processing function unit 10a advances the processing to step S6 to perform tracing of an object based on a motion prediction, and advances the processing to step S7.

Next, the table management function unit 10b uses the object image that the image processing function unit 10a detected in step S5 to update the object search table. That is to say, the table management function unit 10b adds table data corresponding to the moving image content being decoded to the existing table management function unit.

Subsequently, as processing in step S8, the progress bar management function unit 10c displays the moving image of the moving image content on the screen of the display unit 13. Note that at this time the progress bar alone is displayed, but the reduced images are not displayed.

Subsequently, as the processing in step S9, the image processing function unit 10a determines whether or not decoding of the moving image content has been completed. Subsequently, in the case that decoding of the moving image content has not been completed, the control and arithmetic unit 10 returns the processing to step S3, and in the case that decoding of the moving image content has been completed, advances the processing to step S13.

Upon advancing to the processing in step S13, the table management function unit 10b completes creation of the object search table corresponding to the moving image content. After this step S13, the control and arithmetic unit 10 ends the processing of this flowchart in step S14.

Also, in the event that determination is made in step S2 that the object search table has been created, and the processing proceeds to step 10, the image processing function unit 10a executes decoding of the moving image content, and also creates a reduction image such as described above based on the object search table and the selection instruction of an object image by the user or the like.

Also, as the processing in step S11, the progress bar management function unit 10c at this time displays the progress bar such as described above, and displays the reduced images in the vicinity thereof.

Subsequently, as the processing in step S12, the image processing function unit 10a determines whether or not decoding of the moving image content has been completed. Subsequently, in the event that decoding of the moving image content has not been completed, the control and arithmetic unit 10 returns the processing to step S10, and in the event that decoding has been completed, advances the processing to the above step S14.

The following examples can be conceived as other embodiments of the present invention.

With the above progress bar, a portion thereof may be enlarged and displayed. In this case, with regard to each frame corresponding to the progress bar of this enlarged and displayed portion, detection of an object image such as described above, reference of the object search table by the detected object image, display of reduced images based on reference thereof, or the like may be performed.

The reduced images displayed in the vicinity of the progress bar in an array may have the same size, or may have a different size. That is to say, as an example, the reduced image of a frame nearest the frame being now played may be displayed greater than others, or may be changed in color.

The reduced images displayed in the vicinity of the progress bar in an array may be, for example, semi-transparent images so as not to hinder the images of the moving image content being played.

The reduced images arrayed in the vicinity of the progress bar may be only reduced images of frames that are portions that have not been played. That is to say, each time the playback display of each frame ends, the reduced image of the frame after playback display may sequentially be eliminated from the screen. Thus, in the case that the reduced image of a frame after playback display is sequentially eliminated from the screen, many more screen display regions can be secured as to each reduced image of a frame that has not been played, and accordingly, the number of displays of reduced images of frames after playback display can be increased, for example. In goes without saying that the reduced image of a frame after playback display may be remained on the screen as is. Thus, in the case that the reduced image of a frame after playback display has been remained on the screen, the user can readily confirm a desired frame after playback display, and can readily specify, for example, a frame serving as a playback object at the time of so-called reverse playback.

The object identification information registered in the object search table may be liked with, for example, address book data within the portable telephone terminal. For example, in the case that the object identification information is correlated with a name or face image or the like registered in the address book data, the user can specify a name or face image of the address book by selecting an object image. That is to say, for example, in the case that there is the object image of a person's face registered in the address book within the playback image of the moving image content, access as to this person by telephone or mail can be performed by selecting the object image of the face thereof.

With the above embodiment, in the event that an object image has been selected during playback of a moving image content, the frame corresponding to this selected object image is searched, but the frame to be searched based on this selected object image may be a frame within another moving image content.

CONCLUSION

As described above, according to the portable telephone terminal according to an embodiment of the present invention, reduced images of frames including a desired object image are displayed above the progress bar during playback display of a moving image content. Also, according to the portable telephone terminal according to the present embodiment, in the case that there is an object image registered in the object search table within in an image being played and displayed, the object image thereof can be selected. With the portable telephone terminal according to the present embodiment, in the case that a desired object image has been selected, reduced images of frames including the selected object image thereof are displayed. Accordingly, the user using the portable telephone terminal according to the present embodiment can find a desired scene including a desired object image in a short period of time, readily and in a sure manner. In particular, in the case that a moving image is displayed on the screen of the portable telephone terminal, the user is not able to continuously gaze at the screen, and accordingly, it is difficult to fine a desired scene, for example, by fast forwarding or fast rewinding, but according to the present embodiment, the user does not have to perform gazing at the screen by fast forwarding or fast rewinding, and can speedily find the desired scene.

Also, according to the present embodiment, detection of an object image, and generation of a reduced image are performed regarding a synchronous frame that can be decoded with only one frame, and reference of other frames does not have to be performed. Therefore, with the present embodiment, image processing for detection of an object image and for generation of a reduced image is light, and accordingly, detection of an object image, and generation of a reduced image can speedily be performed. Also, for example, updating of the display can be performed in a short period of time even at the time of updating the display of reduced images by selection of an object image.

Note that description of the above embodiment is an example of the present invention. Accordingly, the present invention is not restricted to the above embodiment, and it goes without saying that various changes can be made according to a design or the like without departing from the essence and spirit of the present invention.

Though the above embodiment assumes a portable telephone terminal, the present invention may also be applied to video cameras or digital cameras whereby playing and taking of a moving image can be performed, and personal digital assistants such as portable personal computers.

What is claimed is:

1. An apparatus, comprising:
circuitry configured to
reproduce video content comprising a plurality of frames;
display a progress bar representing a current playback position in the video content, the progress bar indicating on a left side video that has already been played;
display a plurality of images, each of the plurality of images being displayed separately and distinctly, and representing one of a plurality of objects shown in the video content;
receive, via a user interface, a user selection of one of the plurality of images which represents one of the plurality of objects which is displayed separately and distinctly; and
display a plurality of groups of identified frames in which the one of the plurality of objects corresponds to the selected one of the plurality of images, at the progress bar and the current playback position at the progress bar.

2. The apparatus according to claim 1, wherein the circuitry is further configured to:
populate the progress bar with a predetermined mark representing the times of the plurality of groups of identified frames in the progress bar.

3. The apparatus according to claim 1, wherein:
the circuitry is further configured to move a reproduction position of the video content to a reproduction position of one of the plurality of groups of identified frames.

4. The apparatus according to claim 1, wherein the circuitry is further configured to:
detect the plurality of objects from each of the plurality of frames of the video content during reproduction.

5. The apparatus of claim 1, wherein the circuitry is further configured to:
extract a frame from the plurality of frames including the one of the plurality of objects corresponding to the selected one of the plurality of images, and generate display data including the extracted frame.

6. The apparatus of claim 1, wherein the circuitry is further configured to:
extract, from the plurality of frames including the one of the plurality of objects corresponding to the selected one of the plurality of images, a single frame representative of the plurality of frames over a predetermined time period to display.

7. The apparatus of claim 1, wherein the circuitry is further configured to:
extract, from a plurality of frames including the one of the plurality of objects corresponding to the selected one of the plurality of images, a frame at a time of a scene change occurring from the video content to display.

8. The apparatus of claim 1, wherein the circuitry is further configured to:
generate display data of the progress bar and the current playback position to further include a bar that displays a playback time corresponding to a sequence of frames from the video content that include the one of the plurality of objects corresponding to the selected one of the plurality of images.

9. The apparatus according to claim 1, wherein each of the plurality of objects is linked with address book data indicating a name or face image registered in the address book data.

10. An apparatus comprising:
circuitry configured to
receive video content comprising a plurality of frames;
detect a plurality of objects from the plurality of frames of the video content;
generate image data of the plurality of the objects which have been detected;
identify a plurality of frames corresponding to one of the plurality of objects which has been displayed separately and distinctly; and
generate display data of time of the plurality of identified frames,
wherein the plurality of identified frames are displayed at a progress bar, the progress bar representing a current playback position in the video content and indicating on a left side video that has already been played.

11. The apparatus according to claim 10, wherein the identify frames is performed based on a user selection.

12. The apparatus according to claim 11, wherein the generate display data is performed based on frames among the plurality of frames which include the one of the plurality of objects corresponding to the user selection.

13. The apparatus according to claim 10, further comprising:
a display to display the display data.

14. The apparatus according to claim 10, further comprising:
an input device to receive input from a user which is used to identify the one of the plurality of objects.

15. The apparatus according to claim 1,
wherein the progress bar indicates the video that has already been played by being darker on a left side.

16. The apparatus according to claim 10,
wherein the progress bar indicates the video that has already been played by being darker on a left side.

* * * * *